Feb. 15, 1938. W. COLVIN, JR 2,108,041
AEROPLANE
Filed Aug. 21, 1934   6 Sheets-Sheet 1
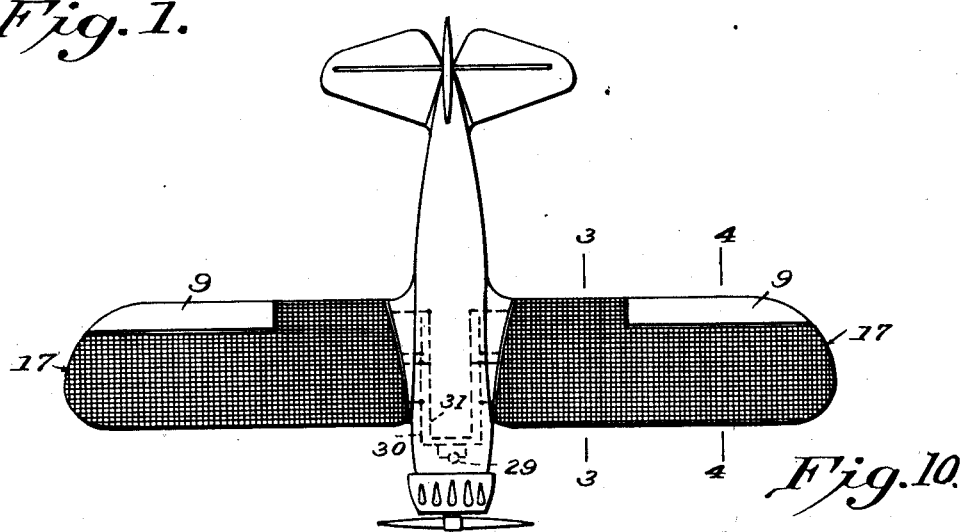
Fig. 1.
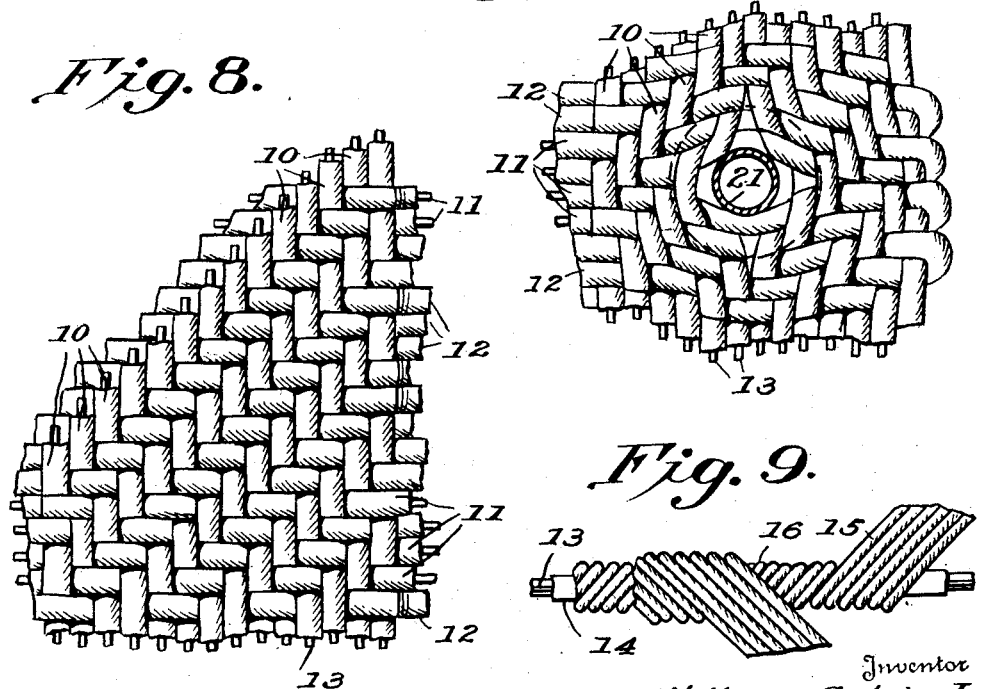
Fig. 8.    Fig. 10.    Fig. 9.
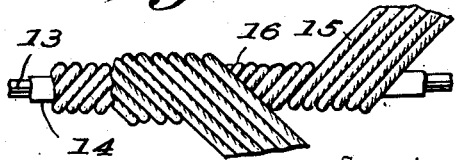
Inventor
William Colvin Jr.
By Milans & Milans
Attorneys Feb. 15, 1938. W. COLVIN, JR 2,108,041
AEROPLANE
Filed Aug. 21, 1934 6 Sheets-Sheet 2
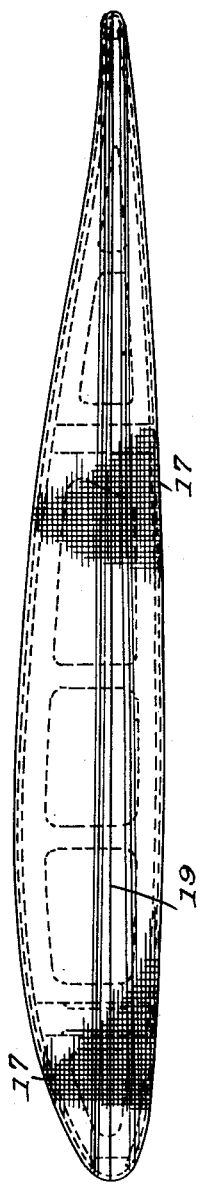
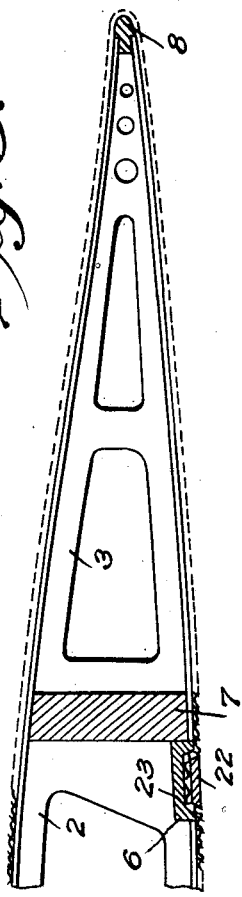
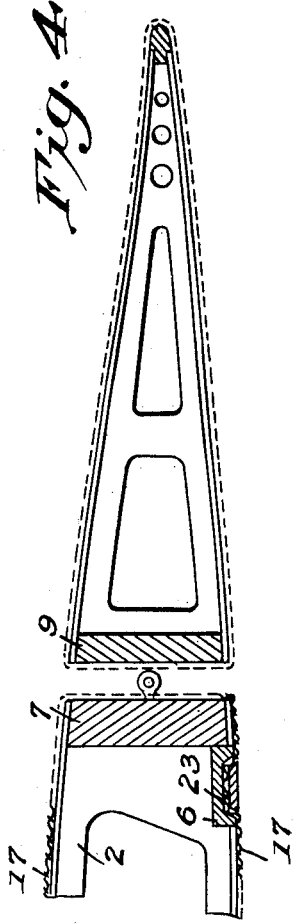
Inventor
William Colvin Jr.
By Milans & Milans.
Attorneys Feb. 15, 1938. W. COLVIN, JR 2,108,041
AEROPLANE
Filed Aug. 21, 1934 6 Sheets-Sheet 3

Inventor
William Colvin Jr.

Milans & Milans
Attorneys

Feb. 15, 1938. W. COLVIN, JR 2,108,041
AEROPLANE
Filed Aug. 21, 1934  6 Sheets-Sheet 4
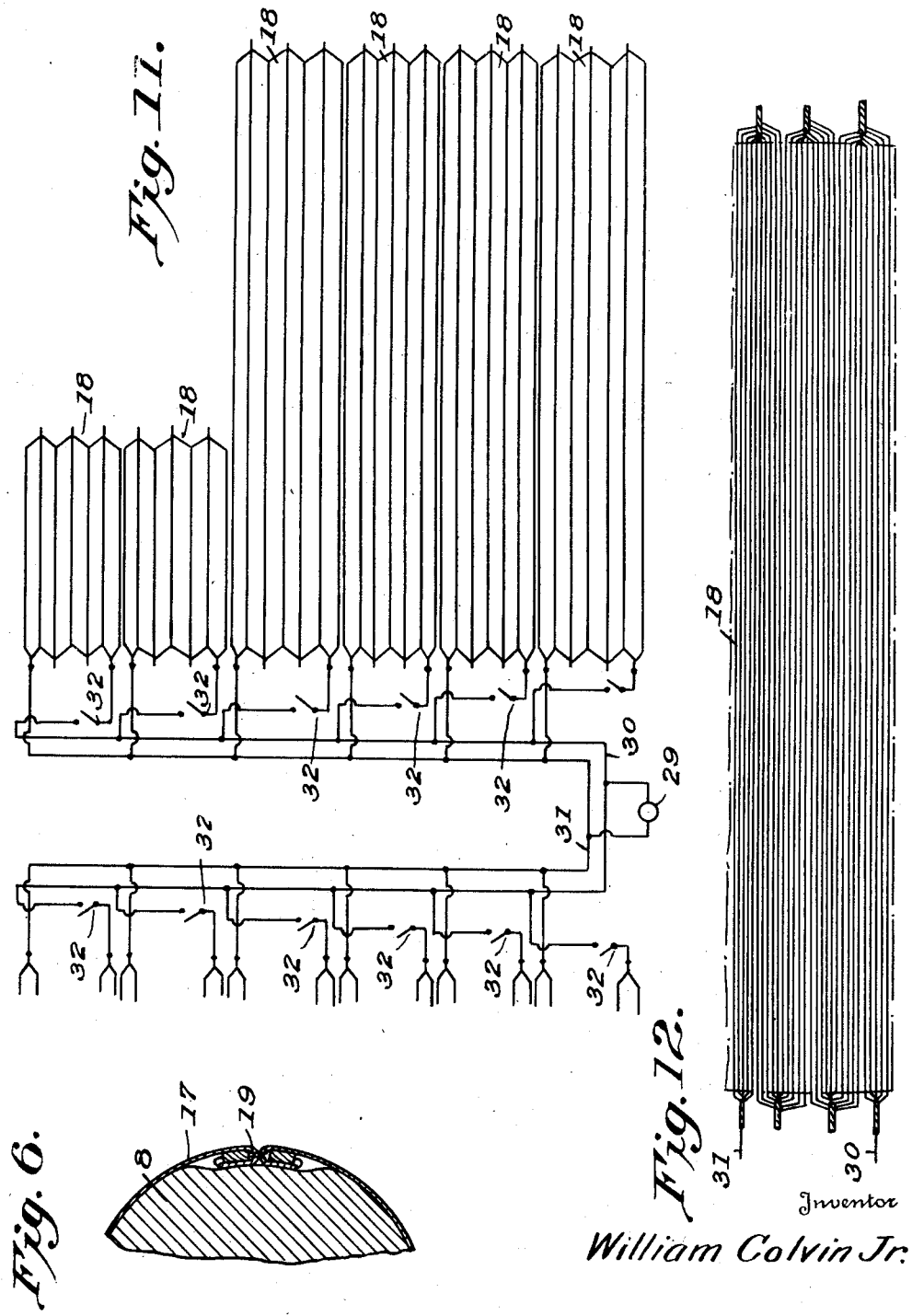

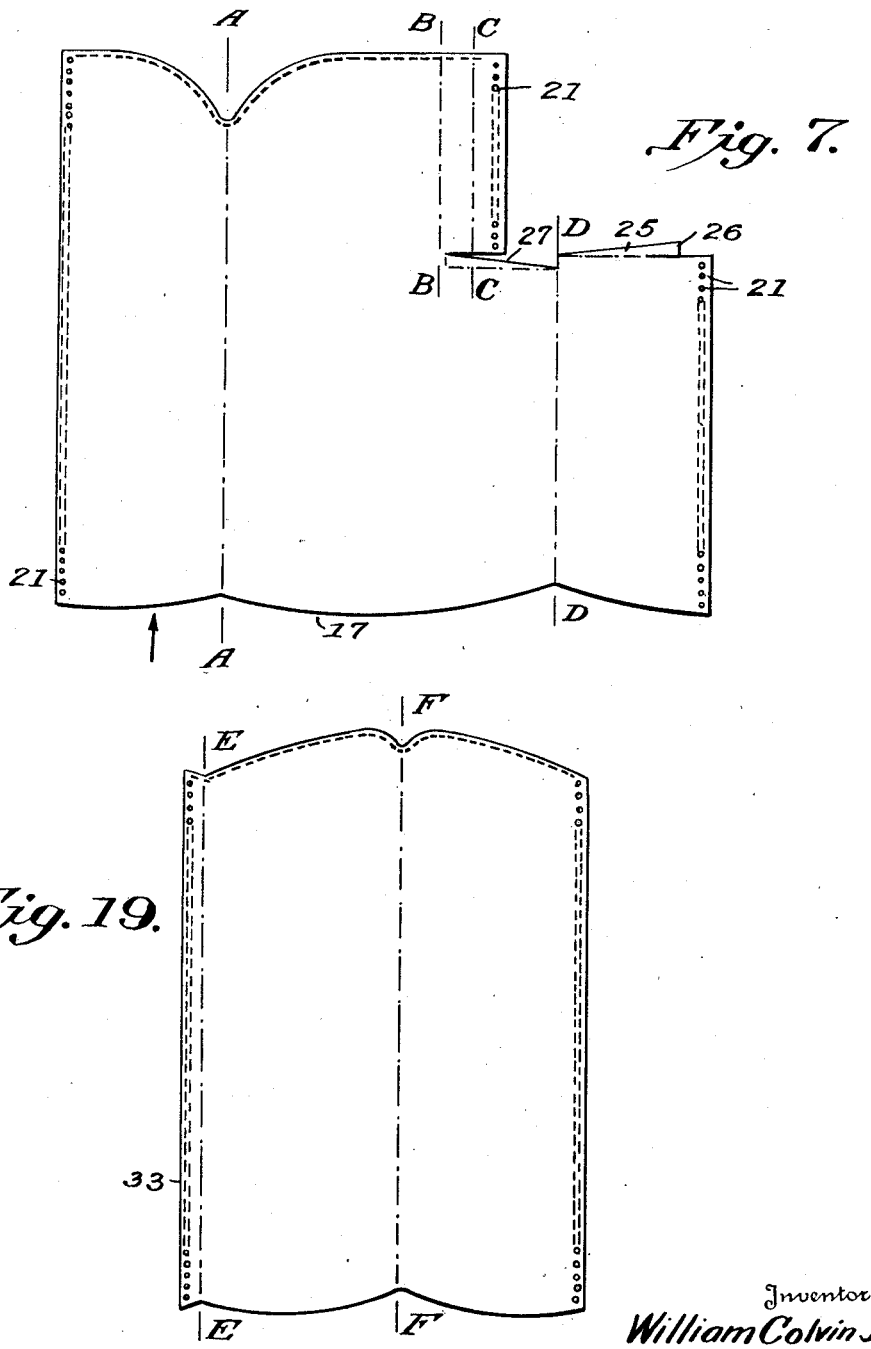

Feb. 15, 1938.    W. COLVIN, JR    2,108,041
AEROPLANE
Filed Aug. 21, 1934    6 Sheets-Sheet 6
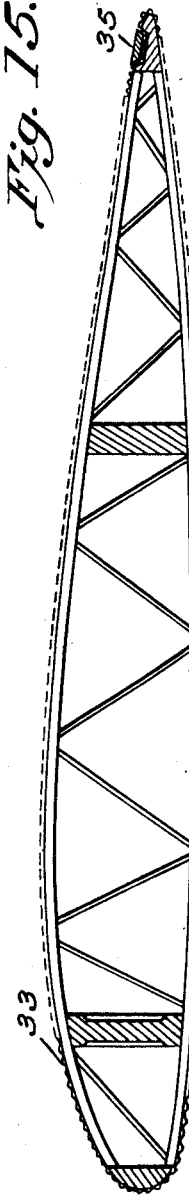
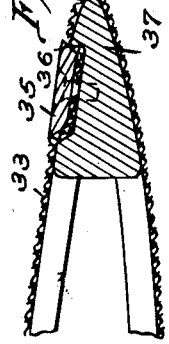
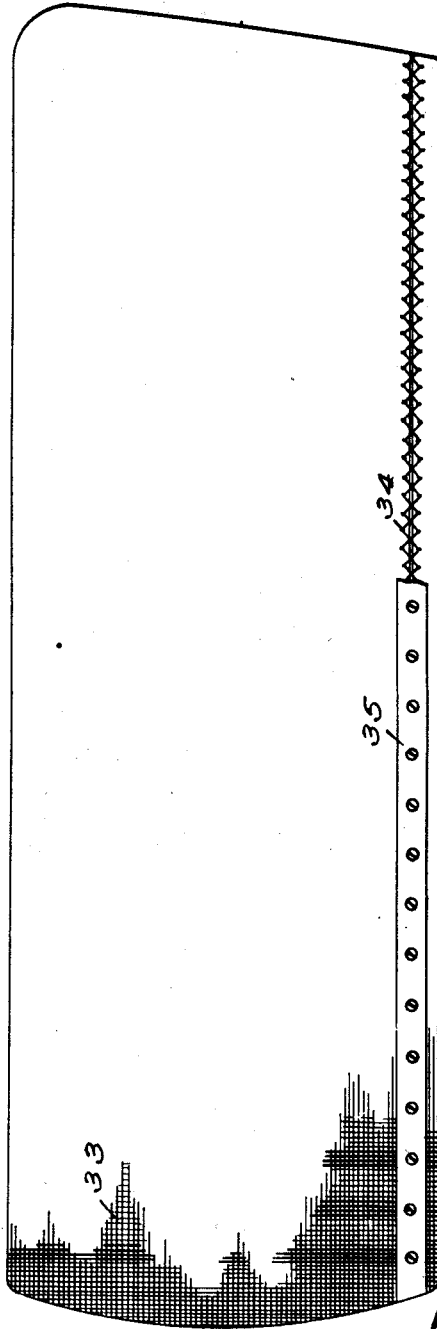
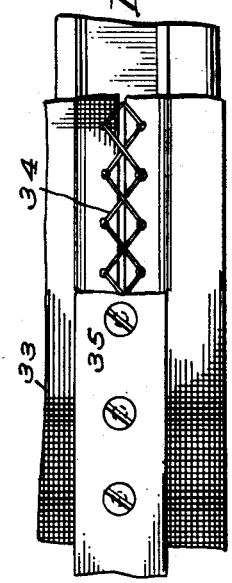
Inventor
William Colvin Jr.
By Milans & Milans.
Attorneys Patented Feb. 15, 1938

2,108,041

UNITED STATES PATENT OFFICE 2,108,041

AEROPLANE

William Colvin, Jr., Troy, N. Y.; Ella F. Colvin and Ruth E. Sharpe, executrices of said William Colvin, Jr., deceased, assignors to Paul Gayne, New York, N. Y.

Application August 21, 1934, Serial No. 740,834

5 Claims. (Cl. 244—134)

This invention relates to improvements in aeroplanes and more particularly to an improved wing surface therefor and improved means for heating the wing and similar surfaces thereof to prevent the accumulation of snow and ice thereon.

Objects of the invention are to provide an improved wing surface that will possess great strength and durability, and to provide efficient heating means that will be of simple, light, compact, durable construction, that can be readily applied to the wings of conventional types of aeroplanes without material change in the structure thereof and at low cost.

Another object of the invention is to provide improved heating means of the character referred to which will provide for heating substantially the entire wing surface or selected areas thereof as desired.

The invention, with other objects and advantages thereof, and the particular construction, combination and arrangement of parts comprising the same, will be understood from the hereinafter contained detailed description when considered in connection with the accompanying drawings, forming part hereof and illustrating several embodiments of the invention.

In the drawings:

Figure 1 is a top plan view of an aeroplane equipped with heating means constructed in accordance with the present invention.

Fig. 2 is an end view of one of the wings.

Fig. 3 is a transverse section on the line 3—3 of Figure 1.

Fig. 4 is a fragmentary sectional view on the line 4—4 of Figure 1.

Fig. 6 is a longitudinal section of an end portion of one of the wings.

Fig. 7 is a plan view of the blank or sheet of fabric from which the covering and heating means for the wing is formed.

Fig. 8 is a magnified view of a portion of the woven fabric covering for the wing.

Fig. 9 is a greatly magnified view of one of the composite metal and textile fiber threads of the wing covering.

Fig. 10 is a magnified view of an edge portion of the wing covering with one of the metal eyelets.

Fig. 11 is a diagrammatic view illustrating the independent heating units formed by the wire cores of threads of the covering of one of the wings and the connection thereof and also the connections for the heating units of the other wing covering with the feed wires.

Fig. 12 is a diagrammatic view showing the grouping and connections of the wire cores of the threads forming one of the heating units.

Fig. 15 is a transverse section of a slightly modified construction illustrating the application of the invention to a wing without an aileron.

Fig. 16 is a top plan view of the construction illustrated in Figure 15.

Fig. 17 is a fragmentary top plan view of a portion of the construction illustrated in Figure 16.

Fig. 18 is a transverse section of an end portion of the wing illustrated in Figure 16.

Fig. 19 is a plan view of the blank or sheet of fabric for forming the covering for the wing illustrated in Figures 15 and 16.

Figure 5:
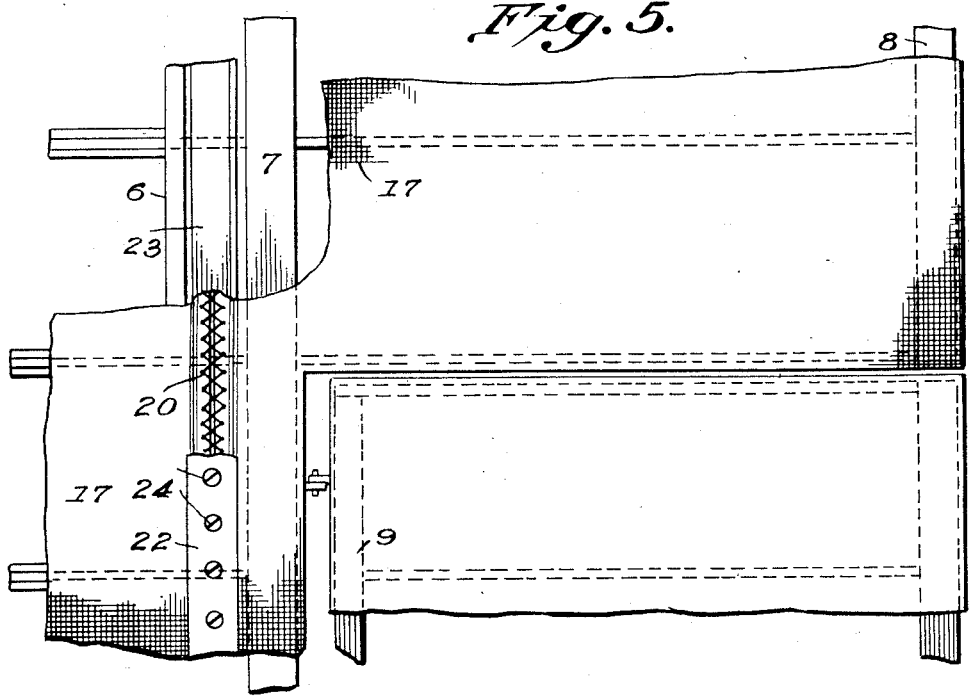
Fig. 5 is a fragmentary bottom plan view of one of the wings.

While specific embodiments of the invention are illustrated in the drawings, it will of course be understood that changes and modifications may be made in the particular constructions shown, and the invention may be embodied in other forms as will appeal to those skilled in the art and falling within the scope of the appended claims, without departing from the spirit of the invention.

Referring to a detail description of the particular embodiment of the invention illustrated in Figures 1 to 14, the invention is here shown applied to an aeroplane of the monoplane type. The frame structure of the wings is of conventional form including transverse strut members 1, 2, and 3 and longitudinal members 4, 5, 6, 7 and 8. 9 designates the usual ailerons.

In providing my improved wing covering and heating means, I employ woven fabric of the general structure disclosed in my Patent No. 1,965,542 dated July 3, 1934, formed in substantial part of thread composed partially of wire and partially of textile fibres but having to a substantial degree the characteristics of softness and flexibility of a fabric of similar weave composed wholly of textile threads, the fabric being used to form a covering for the wing structure and constituting the wing surface, and the wire cores of some of the composite threads of the covering being connected and utilized as electrical heating means therefor.

Referring to Figure 8 of the drawings, in this particular embodiment of the invention, the fabric shown has the entire warp thereof composed of wire reinforced threads 10 and the weft is composed partially of wire reinforced threads 11 and partially of textile threads 12.

The reinforced threads of the warp and the weft each comprise a fine easily flexible metal wire core 13 having a flexible insulating coating of enamel 14 and enclosed in two layers of wrappings 15, 16, of fibrous material such as threads of silk, wool, cotton or the like, the wrappings of thread being relatively disposed on the core so as to overcome any tendency of the composite thread to kink or snarl when used in a weaving machine. The wire cores of the warp threads 10 and the reinforced threads 11 of the weft may be made of copper, irons, low carbon steels, or any other suitable metal or metal alloys. The reinforced threads 11 of the weft, in this particular embodiment of the invention, are provided primarily to serve as tension wires in securing the fabric on the wing structure as hereinafter explained, and the wire cores of these threads are preferably constructed of steel, metal alloy, or any other suitable metal that will afford the greatest strength. The fabric may be treated with any suitable composition that will tend to make the same fire and water resistant.

The wing covering and heating means, designated generally by the numeral 17, is shown formed from a continuous piece of fabric. The blank or sheet of fabric from which the covering and heating means is formed is illustrated in Figure 7 of the drawings. The wire cores of the warp threads 10, which extend in the direction of the arrow lengthwise of the sheet of fabric, are connected in groups throughout the sheet to provide a plurality of independent heating units 18, each group or heating unit being composed of the wire cores of series of adjacent threads connected together at their ends, and the adjacent series of the connected wire cores being in turn connected with each other at their ends as illustrated in Figure 12. The several heating units are shown diagrammatically in Figure 11, there being in this particular exemplification of the invention, six heating units to each wing covering.

Figures 13, 14:
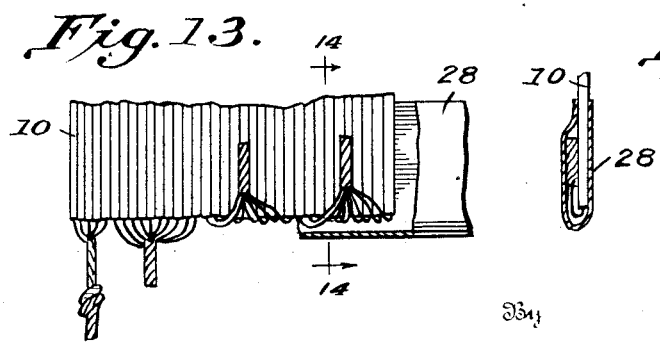
Fig. 13 is a fragmentary top plan view of an inner edge portion of the fabric covering of one of the wings and illustrating how the wire cores of the threads are connected at their ends and turned back.
Fig. 14 is a transverse section on the line 14—14 of Figure 13.

The number of wires to each heating unit and the number of heating units may be varied to best accomplish the purpose depending upon the size of the wire cores of the threads, the extent of surface to be heated, and the amount of heat required. In connecting the series of wire cores, the fibre wrappings are removed from the end portions thereof, and the bared end portions twisted together and solder applied. The connected end portions of the wire cores are then wrapped with insulating tape and folded back against the fabric sheet as illustrated in Figures 6 and 13.

In forming the covering, the blank or sheet of fabric is folded longitudinally along the dotted lines A—A, B—B, C—C, D—D, and the upper and lower folds at their outer end portions are secured together by lines of stitching 19. The longitudinal edge portions of the sheet are connected by a flexible lacing 20 engaging rows of eyelets 21 along said edge portions. This construction provides for readily slipping the covering over the wing frame and drawing the same up tight to present a smooth outer surface for the wing. The thread used in the stitching 19 is preferably wire core thread of the character heretofore described on account of the strength thereof, and the lacing 20 likewise is preferably tape composed of wire core threads. The covering is securely held in place on the frame by a clamping plate 22 fitting in a longitudinal recess 23 in the frame member 6 over the longitudinal edge portions and lacing of the covering. The clamping plate is secured to the frame member 6 by screws 24, the outer face of the clamping plate extending flush with the outer face of the covering, and the heads of the screws being countersunk.

As shown in Figures 1 and 5 of the drawings, the outer section of the covering is reduced in width to accommodate the aileron. After the covering has been laced up on the wing frame, the marginal portions 25 and 27 of the blank are folded back and the end portion 26 of the portion 25 is folded at right angles to the first fold of said portion over the adjoining edge portion of the frame and securely taped thereto and to the adjacent edge portion of the covering. As shown in Figure 13, the covering is provided at its inner marginal edge with a binding 28 enclosing the connected ends of the wire cores of the heating units.

Electrical energy is supplied to the heating units 18 by a generator 29 suitably located on the plane and driven from the engine. Referring to Figure 11, 30 and 31 designate main conductors leading from the generator 29. As shown, the heating units 18 of each of the wings are connected in parallel with the main conductors 30 and 31, and each heating unit is provided with a switch 32. In the diagrammatic showing of the circuit connections in Figure 11, for the sake of clearness, the switches 32 are shown located adjacent the heating units but it will be understood that in practice these switches and also a switch (not shown) in the main circuit are located on the instrument board of the cock pit to be controlled by the operator.

The modified construction of heating means and covering illustrated in Figures 15 to 19, is constructed the same as that illustrated in Figures 1 to 14, hereinbefore described, except that in this instance, the covering is applied to a wing that does not have an aileron associated therewith, and is formed from a blank or sheet of fabric of general rectangular outline, and the clamping plate for the covering, as shown, may be located at the upper side of the wing at the trailing edge. However, as suggested in other figures, the clamping plate may be located at the lower side of the wing at the trailing edge, and the same may be so located in this instance. In these views, 33 designates the heating means and covering, 34 the lacing and 35 the clamping plate fitting over the lacing and longitudinal edge portions of the covering into a recess 36 of the frame member 37. The blank or sheet of fabric from which the covering is formed is shown in Figure 19, the blank being folded longitudinally along the lines E—E, F—F, and the upper and lower folds at their outer end marginal portions being secured by stitching.

Figure 20:
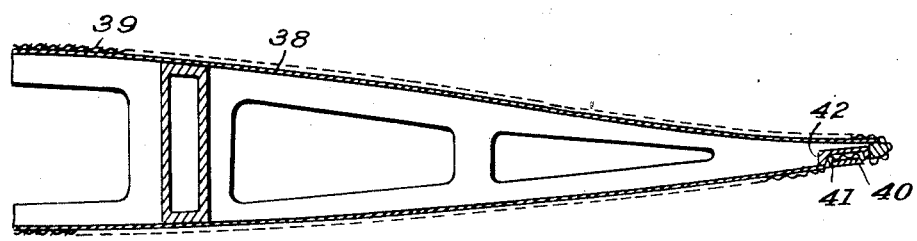
Fig. 20 is a transverse section of a wing having a metal surface with the invention applied thereto.

In Figure 20 the invention is shown applied to a wing having a metal surface. In this view, 38 designates the metal surface of the wing and 39 the heating means and covering secured thereon by a clamping plate 40 fitting in a longitudinal recess 41 of the frame portion 42 over the longitudinal edge portions and lacing of the covering, which is of the same construction as that previously described.

It will be noted that by the particular construction and arrangement of parts hereinbefore set forth, efficient heating means is provided of simple, compact construction that can be easily applied to the conventional types of aeroplanes without material change in the structure thereof and at low cost. As will be appreciated, the heating elements are so associated with the wing surface as to efficiently heat the same and prevent the accumulation of snow and ice thereon. The invention provides in a simple practical way for heating means throughout substantially the entire wing surfaces, and for employing the heating means as a whole or heating selected areas of the wing surface at the will of the operator. The wire cores of the composite threads of the warp in addition to acting as heating elements lend strength to the fabric covering and the covering is also materially strengthened by the reinforced threads of the weft, so that the wing surface afforded possesses great strength and durability.

What I claim is:

1. In an aeroplane, a wing including a frame and a covering therefor formed of a continuous piece of woven fabric folded longitudinally upon itself and connected along its longitudinal edge portions by a flexible lacing, said fabric having a substantial portion of the warp thereof composed of threads each having a metal wire core enclosed in wrappings of textile thread, and portions of the weft composed of threads each having a strengthening wire core of steel enclosed in wrappings of textile thread, the wire cores of a plurality of said warp threads being connected and constituting an electrical heating unit.

2. An aeroplane wing provided with a fabric covering, and securing means for the covering including means for drawing the same taut, said means comprising a lacing engaging adjacent edges of the covering, and said covering having as a part thereof tensioning wires extending transversely of the lacing.

3. An aeroplane wing provided with a fabric covering for a portion thereof, the covering including as a part thereof electrical heating means, means for securing the covering in place including means for tensioning the same, and reinforcing means in the covering to resist distortion of the covering under the action of the tensioning means.

4. An aeroplane wing having a longitudinal recess and provided with a fabric covering entirely surrounding the same, and means for securing the covering in place including a lacing engaging adjacent edges of the covering for drawing the same taut, in combination with means for covering and forcing the lacing in said recess.

5. An aeroplane wing having a recess and provided with a fabric covering entirely surrounding the same, and means for securing the covering in place including a lacing engaging adjacent edges of the covering for drawing the same taut, in combination with means for covering and forcing the lacing in said recess.

WILLIAM COLVIN, Jr.